United States Patent [19]
Kagitani

[11] Patent Number: 5,985,101
[45] Date of Patent: Nov. 16, 1999

[54] METHOD AND APPARATUS FOR THE REMOVAL OF HARMFUL SUBSTANCES FROM VARIOUS OBJECTS OR MATERIALS

[76] Inventor: Takeo Kagitani, 308 Mano-Nogizaka, 8-12-30 Akasaka, Minato-Ku, Tokyo, Japan, 107

[21] Appl. No.: 09/060,473

[22] Filed: Apr. 15, 1998

[51] Int. Cl.⁶ .............................. C02F 1/78; B01D 53/32
[52] U.S. Cl. .............. 204/164; 422/186.04; 422/186.05; 422/186.06; 588/204
[58] Field of Search ....................... 204/164; 422/186.04, 422/186.05, 186.06; 588/204

[56] References Cited

U.S. PATENT DOCUMENTS 5,445,800  8/1995  Isoda et al. ......................... 422/186.04

*Primary Examiner*—Arun S Phasge

*Attorney, Agent, or Firm*—Ward & Olivo

[57] ABSTRACT

The present invention relates generally to the removal of harmful substances from various objects or materials. More specifically, this invention relates to an improved method and apparatus for removing the harmful substances (i.e., toxins), from a variety of materials or objects by utilizing high-voltage electricity in conjunction with large surface charcoal and water. The device of the present invention comprises a first conductive container which has large surface charcoal placed within it. This first container is then placed into a larger second conductive container which is filled with ordinary water (i.e., tap or faucet water), sealed with a cover and insulated from the floor with insulating material. Finally, an electric source device generates 10,000 Volts at 1 Pico Ampere (10 micro watts) which is transfered to the purification device of the present invention. The electric current is applied for an extended period of time, after which the object or material is "detoxified".

20 Claims, 2 Drawing Sheets

METHOD AND APPARATUS FOR THE REMOVAL OF HARMFUL SUBSTANCES FROM VARIOUS OBJECTS OR MATERIALS

TECHNICAL FIELD OF THE INVENTION

The present invention relates generally to a material detoxification device, used to remove toxins from various materials. More specifically, this invention relates to an improved method and apparatus for removing harmful substances (i.e. toxins), from a variety of materials or objects by utilizing high-voltage electricity in conjunction with large surface charcoal and water to provide toxin-free (or harmless) materials.

BACKGROUND OF THE INVENTION

Presently, natural resources are being rapidly depleted by pollution. These resources include water, air, and food. Scientific studies have been done at the Awaji Island Monkey Center which shows that toxins in food cause a high percentage of deformed monkey babies. The Center fed the monkeys the same imported foods (e.g. wheat, corn, soybeans, peanuts, etc.) that humans consume. Now, there is an increase amount of human babies that are born with abnormalities of an unknown cause. These abnormalities are probably due to agricultural medicines and chemical fertilizers used in growing crops for human comsumption.

Another factor that probably contributes to the abnormalities of human babies is the pollution in the environment. Also, bottled water has become a greatly demanded source of drinking water today. However, the bottled waters presently sold on the market, although somewhat inexpensive, do in fact contain harmful preservatives (perhaps even poisonous) which allow for the long-term storage of this water. The present invention provides a revolutionary method for removing toxins from various materials in a medium of water by utilizing a 10,000 volt electric charge in conjunction with large surface charcoal to provide toxin-free materials. For example, pesticides can be removed from fruits and vegetables for safe consumption. Other examples of materials that can be detoxified are metal materials containing ferric oxide, synthetic resins, poisonous gases, etc. Alternatively, the present invention provides an improved method and apparatus which purifies water by utilizing high-voltage electricity in conjunction with large surface charcoal. This provides clean water for drinking.

Though there are no known methods like the present invention for detoxifying materials, there are known in the art general water purification methods and devices. These consist of methods and devices wherein the liquid (water) is passed, sequentially or in parallel, through inter-electrode gaps formed by flat electrodes, with a constant or pulsating voltage in the range of 3 to 30 volts.

Disadvantages of the above process, resulting from a rather low field intensity, its uniformity and the character of the process hydrodynamics, reside in the deposition of an oxide film on the anode surface, the presence of a concentration polarizing effect, deposit formation on the cathode, increasing equivalent resistance of the inter-electrode space, and the necessity of introducing an oxidizing agent to convert $Fe(OH)_2$ into $Fe(OH)_3$.

Another prior art method for the electric purification and decontamination of liquids comprises passing a liquid through a packed inter-electrode space comprising of metal chips or other metal particles, arranged in layers separated from each other by porous diaphragms, the voltage across the electrodes being less than 100 volts.

A disadvantage of the above-described method is that the porous diaphragm tends to become clogged with metal hydroxide due to a limited volume of flake removal, resulting in increased hydraulic resistance to the flow of liquid, with a considerable portion of the flow passing through the packed inter-electrode space without taking part in the purification process, since the surfaces of the chips in the packing are in a state of mutual electrical contact.

According to another known method the liquid passes through the inter-electrode space formed by coaxially arranged cylinder electrodes, the voltage applied thereto being less than 100 volts. A disadvantage of this method is that there is a low efficiency of dipolophoresis, which is due to low non-uniformity of the electric field and concentration of suspended particles. This, in turn, is due to intensive deposition of particles on the anode under the conditions of quiet hydrodynamics of the process.

Also known in the art is a method for the purification and decontamination of liquids by means of a high-voltage electric discharge wherein a liquid is subjected to the effect of electrical discharge, the voltage used being in the order of 10,000–100,000 volts, current over 100 amperes and pulse duration of from 0.1 to 100 microseconds, which results in heavy losses of electric power, the presence of reactance losses, unsatisfactory bactericidal effect, dangerous sounds, voltages and currents, as well as the formation of cancerogenic substances in the process of purification.

Also known in the art is an apparatus for effecting the purification and decontamination of liquids for realizing the first mentioned method, which apparatus comprises a coagulation chamber having electrodes in the form of flat plates. A disadvantage of this apparatus resides in a large anode surface and the impossibility of smooth adjustment of the inter-electrode space, which results in the formation of an oxide film on the surface of the anode, the appearance of concentration polarization, the formation of deposits on the cathode which increases equivalent resistance of the inter-electrode space, and the need to introduce an oxidizer for the purpose of converting $Fe(OH)_2$ into $Fe(OH)_3$.

The known apparatus for effecting the electric purification and decontamination of liquids realizing the above-mentioned method wherein packed electrodes are used in the form of a bank of cells separated from each other by porous diaphragms arranged between current-conducting electrodes, has disadvantages which reside in the fact that as the process proceeds the packed material tends to dissolve, which calls for the application of special devices for compressing the packed material and requires the current polarity to be changed.

There is also known an apparatus for realizing the above-mentioned method wherein use is made of cylindrical electrodes and the apparatus comprises a coagulation chamber with coaxial cylindrical electrodes.

A disadvantage of the apparatus resides in the fact that due to low non-uniformity of the electrical field of the inner large-diameter electrode, which reduces the value of dipolophoretic forces, independent of the charge of the particles, it is necessary to provide a pre-setter for removing large particles having low electric charge.

Also known in the art is an apparatus for the electric purification and decontamination of liquids for realizing the method and employing a high-voltage electrical discharge. In this apparatus the starting liquid flows through a coagulation chamber wherein at least two rod type electrodes are disposed, one of the rod-type electrodes is electrically insulated from the housing of the coagulation by means of an insulator, the electrodes being disposed inside the housing in such a manner that their longitudinal axes lie in parallel planes, the distance between the planes being within the size of the inter-electrode space.

The electrodes in the apparatus are fixedly secured in the housing. Among the disadvantages of the apparatus is a large destruction of insulation of one of the electrodes, a low degree of utilization of the purification volume, the necessity of frequent replacement of one of the electrodes, and the need of having a very high strength housing.

Briefly, Smirnov et al. U.S. Pat. No. 4,169,029, for "Method for Electrical Purification and Decontamination of Liquids and Apparatus for Effecting Same", discloses a method for the electric purification and decontamination of liquids containing suspended and dissolved matter, such as mineral, organic and biological substances, comprises passing a pulsating electric current through a starting liquid, the current having sufficient pulse duration and voltage to cause electric discharge between the electrodes. An apparatus for realizing the method of electric purification and decontamination of liquids comprising a coagulation chamber with at least two rod-type electrodes electrically insulated by means of individual insulators from the housing of the coagulation chamber and mounted together with their insulators to execute reciprocal motion along their longitudinal axes.

Additionally, the science of affecting and treating fluids by submitting them to magnetic fields has been recognized and used for many years. The phenomenon is known as magnetohydrodynamics. It is based on the observations and teachings of Michael Faraday, and appreciated through the analysis of the electromotive forces generated by passing conductive materials between the poles of magnets. A generator is a common utilization of this effect. The Lorentz principal states that ions are separated by a charge when passed between the poles of a magnet. This principal explains in part the effects of treating fluids with magnetic fields. There are most likely additional discoveries to be made in the application of magnetic forces to a flowing fluid. Voluminous additional information, well-known in the art, will not be discussed here, but exists with respect to the above teachings.

The hydrogen atom, prevalent in, for example, water, is known to be highly susceptible to the influences of magnetic fields. An application of this principal is the processing proton magnetometer that is used to measure the total magnetic intensity of a sample of hydrocarbon fluid or water. Another application of this teaching is magnetic resonance imaging (MRI). Even though the purpose of both of these concepts is to measure the energy released by the spinning protons after they are aligned by a magnetic field and subsequently disturbed either by the earth's magnetic field or a radio frequency wave propagated toward the sample, they serve to illustrate the scientifically accepted phenomenon of realigning spinning protons with magnetic force. Additionally, such concepts confirm that energy is released when the spinning protons are so affected.

Spinning protons in fluids including water, alcohol, gasoline, kerosene, and many others act as spinning magnetic dipoles. Under normal circumstances, these protons spin randomly inside their respective atoms. The dipoles are temporarily polarized and aligned by the influence of a magnetic field. Magnets may be employed to create consistent powerful magnetic fields that cause the protons to align and spin in uniform directions. This alignment and subsequent concentration of energy in uniform directions causes an attraction between, for example, the hydrocarbon fuel molecule and the oxygen molecule. When used with water, the result is purification and decontamination of water.

However, prior art magnetic fluid treatment devices are typically inefficient in generating a strong magnetic curtain in tile fluid flow path and are frequently limited in the sizes of conduit they can treat. Additionally, existing designs require manufacturing techniques that result in high cost due to needing completely different components for each size of conduit. The effectiveness of the magnetic field is, of course, dependent upon the strength of the magnetic field and that strength is also known to be inversely proportional to the square of the distance from the magnetic source. The prior art has been generally ineffective in optimizing the magnetic field strength that may be obtained from a permanent magnet array, and has further been ineffective in treating large systems employing conduits of significant cross sectional diameter in which large volumes of fluid pass. The prior art has further not provided magnetic fluid treatment devices which are modularized to accommodate various fluid flow systems and to allow the magnetic treatment of the same to be tailored to a particular system. Additionally, the prior art has typically not proposed magnetic fluid treatment devices which may be either intrusive for implementation with new fluid flow systems, or non-intrusive to be easily added to existing fluid flow systems. By "intrusive", it is contemplated, according to the present invention, that the magnetic fluid treatment device will be inserted in-line, or in series, with the fluid pathway. Conversely, by "non-intrusive", it is contemplated that the magnetic fluid treatment device of the present invention will be affixed to the perimeter or exterior surface of the fluid pathway, such as by clamping a the magnets around the pipe that is carrying the fluid to be treated.

In light of the foregoing, it is a first object of the invention to provide a novel material detoxification device in which utilizes high-voltage electricity in conjunction with large surface charcoal and water to remove toxins from a variety of materials or objects.

Still a further object of the invention provides a material detoxification device which employs a modular design so that additional units can be added if circumstances require, and which further allows for the mounting of the modules to a conduit in a variety of configurations or geometries as circumstances dictate.

Yet an additional object of the invention provides a material detoxification device which may be non-intrusive to accommodate ease of application to existing fluid systems.

A further object of the invention provides a material detoxification device which includes a plurality of parallel devices for treatment of large capacity fluid conduits.

Still a further object of the invention provides a material detoxification device which is reliable and durable in use, and cost effective in implementation, by the use of commonly available materials.

Another object of the invention provides a material detoxification device wherein backing plates can be used for either intrusive or non-intrusive designs.

The foregoing and other objects of the invention which will become apparent as set forth herein in the detailed description of the preferred embodiment of this invention.

SUMMARY OF THE INVENTION

The device of the present invention provides a novel method and apparatus for removing harmful substances (i.e., toxins) from various materials in a water-based medium.

Alternatively, the present invention provides an inexpensive, safe, energy efficient alternative to present water purification systems. The method and device of the present invention is easier to maintain than most home use water purifiers for a variety of reasons: its charcoals only need to be replaced periodically (i.e., on a yearly basis); it produces detoxified objects (i.e., clean food for human consumption, etc.); it requires very little power to operate (e.g., approximately 10 micro watts (10,000 Volts * 1 Pico Ampere) for an extended period of time ranging from approximately 1 hour to approximately 10 hours).

The present invention achieves the "detoxification" of various materials by transmitting an electric charge throughout the water purification device. The device of the present invention comprises a first smaller container filled, wholly or partially, with large surface charcoal. This first container is then placed within a second larger container which is filled with water. Since the first container has a plurality of holes, the water flows throughout the first container as well as the second container. Then, the object containing harmful substances or toxins is immersed in the water in the second container which is then sealed with a cover. A connected electric source then generates and transmits an electric charge to the purification device to "clean" or "detoxify" the object. After an extended period of time, the water and object are removed from the container—purified.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

BRIEF DESCRIPTION OF DRAWINGS

Figure 1:
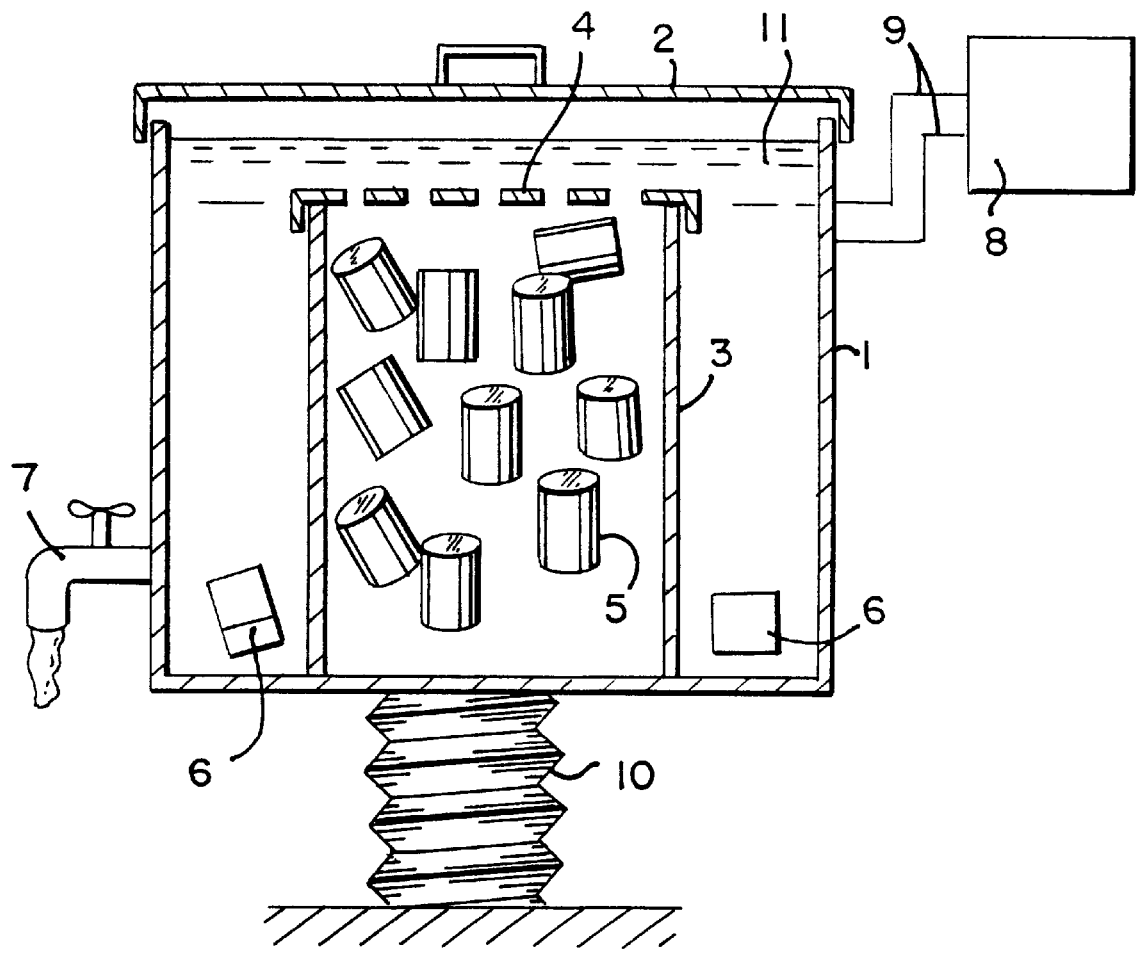
Figure 2:
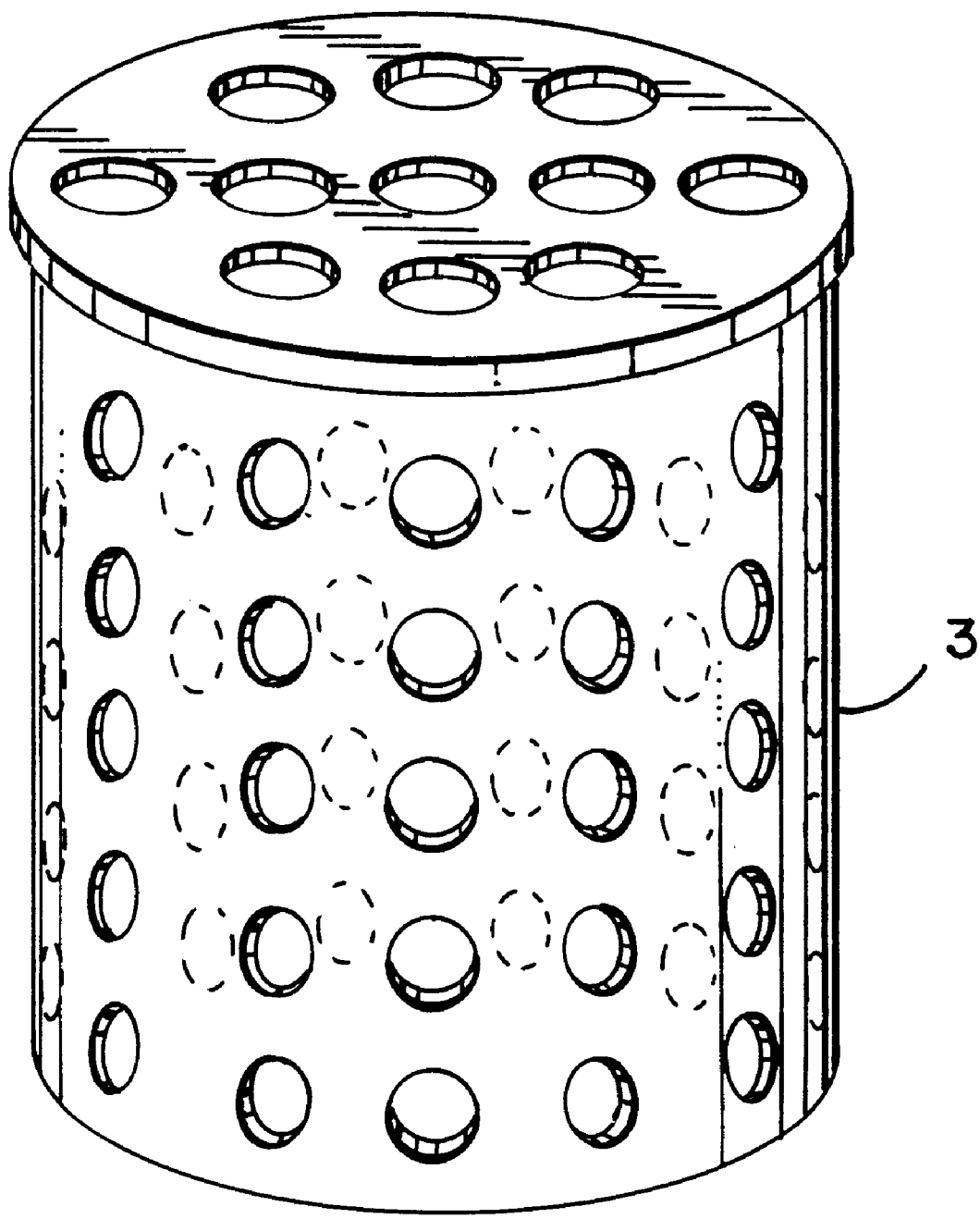

For a more complete understanding of the present invention, reference is now made to the following drawings in which:

FIG. 1 shows a device for the removal of harmful substances from various materials or objects in accordance with the present invention; and FIG. 2 shows the inner container of the device shown in FIG. 1 having a plurality of holes therein in accordance with the present invention.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention. As discussed above, the present invention relates to a method and apparatus for the purification of materials or objects. More specifically, this invention relates to a device which uses high-voltage electricity in conjunction with large surface charcoal to provide purified materials or objects for the protection of humans and the environment. Alternatively, the device and method also provides purified water for drinking.

The present invention provides a novel device that removes harmful substances (i.e., toxins, contaminants, etc.) From a variety of objects or materials. In addition, the purification (or detoxification) device of the present invention has several special features which are novel features of the present invention. First, the device incorporates the use of large surface charcoal immersed in water and held in an open inner container. The molecular character of the large surface charcoal provides for an effective means for passing electrons through the center container, and therefore contributes to the purification of the object or other material immersed in the water in the outer container. Second, the device uses a high voltage, low current electric power source connected to the outer container which transmits an electric charge to the outer container over a period of time. This electric charge causes the impurities in the ordinary (tap or faucet) water to disappear, thereby purifying the water and objects immersed therein.

Referring first to FIG. 1, shown is a device for the detoxification (or purification) of materials according to the present invention. This device comprises a first conductive metal container 3, which is filled with ordinary tap water 11 and large surface charcoal 5. Container 3 has a plurality of holes throughout its surface to allow the free flow of water (as well as the electric charge) throughout the device, as shown in FIG. 2. The molecular character of the large surface charcoal provides an effective means for passing electrons through the center container, and therefore contributes to the detoxification of materials in the outer container. Container 3 also contains a lid with holes and is placed inside a larger, second metal container 1.

Next, the second container 1 is filled with ordinary tap water 11, which also fills container 3, and the contaminated objects or materials 6 which are to be purified and/or detoxified. Second container 1 is then sealed with cover 2.

Also, second container 1 is insulated from the supporting surface (i.e., floor or table) with insulating material 10, and comprises spout 7 which provides for the simple and efficient removal of the water from the device of the present invention.

Also shown in FIG. 1 is an electric source device 8 which is attached to the device of the present invention. Generated by the electric source device 8 is a 10,000 volt electric charge (at 1 pico ampere which is 10 micro watts of power) and is transmitted to the second container 1 via electric cables 9.

This voltage is then applied to the second container for approximately ten (10) hours. Alternatively, continuous time periods of approximately one (1) hour or five (5) hours have also shown significant purification results. After the time period of electrically charging the water has lapsed, the contaminated materials or objects 6 will be purified or detoxified and ready for use. The water can then be removed through spout 7 and when second container 1 is empty, the entire process can be repeated.

As an alternative use of the preferred embodiment of the present invention as described above, disclosed below is the use of the present invention as a water purification device.

Referring again to FIG. 1, shown is a device of the present invention used for the purification of water. Again, the device comprises a first conductive metal container 3 containing large surface charcoal 5 and which is immersed into ordinary tap water 11 which is to be purified. The molecular character of large surface charcoal 5 provides an effective means for passing electrons through the center container, and therefore contributes to the purification of water in the device. Container 3, which has holes throughout its surface (as shown in FIG. 2) is then covered with lid 4 (also having holes) and placed inside a larger, second metal container 1. Next, second container 1 is sealed with cover 2, insulated from the supporting surface (i.e., floor or table) with insulating material 10, and comprises spout 7 which provides for the simple and efficient removal of the purified water from the device of the present invention.

Attached to the constructed device is an electric source device 8. Generated by the electric source device 8 is a 10,000 volt electric charge (at 1 pico ampere which is 10 micro watts of power) and is transmitted to the second container 1 via electric cables 9. This voltage is then applied to the second container for approximately ten (10) hours. Alternatively, continuous time periods of approximately one (1) hour and five (5) hours have also shown significant purification results. After the time period of electrically charging the water has lapsed, the contaminated water 11 will be purified and ready for use. The purified water can then be removed through spout 7 and when second container 1 is empty, the entire process can be repeated.

Briefly in accordance with this invention, electric source device 8 can comprise any source of electric current, including but not limited to ordinary household electric outlets, so long as the electric source used can provide an approximate voltage in the range of 10,000–100,000 volts.

The following tables show the results from a test conducted by the Head of Health Sanitation in Minato-Ku, Tokyo, on the device of the present invention. More particularly, Table 1 lists the results of a water quality test showing the chemical components found in the water after being purified by the purification device according to the present invention; and Table 2 lists the results of a water quality test showing the physical characteristics of the water after being purified by the purification device according to the present invention.

TABLE 1

Results of the water quality test showing the chemical components found in the water after being purified by the purification device according to the present invention.

| Items | Units | Test Results | Quality of Standard Tokyo Water |
|---|---|---|---|
| Nitric Acid Nitrogen/ Nitrous Acid Nitrogen | mg/l | 2.0 | 10 |
| Chlorine Ion | mg/l | 32.4 | 200 |
| Organism (Excess Manganic Acid Potassium Consumption Quality) | mg/l | 1.21 | 10 |
| General bacteria | | 0 | 100 |

TABLE 1-continued

Results of the water quality test showing the chemical components found in the water after being purified by the purification device according to the present invention.

| Items | Units | Test Results | Quality of Standard Tokyo Water |
|---|---|---|---|
| Colon bacillus | | not detected | not detected |

TABLE 2

Results of the water quality test showing the physical characteristics of the water after being purified by the purification device according to the present invention.

| Items | Units | Test Results | Quality of Standard Tokyo Water |
|---|---|---|---|
| Smell | | no abnormality | no abnormality |
| Taste | | no abnormality | no abnormality |
| Color | degrees | 1 | 5 |
| Turbidity | degrees | 0 | 2 |
| Iron | mg/l | 0.05 | 0.3 |
| PH. Value | | 7.0 | ~8.6 |

Referring first to Table 1, listed are the results of tests performed on ordinary tap water using the water purification and/or material detoxification device of the present invention. For this testing, water samples were collected from 308 Mano-Nogizaka, 8-12-30 Akasaka, Minato-Ku, Tokyo on Jan. 28, 1997, and testing began on Jan. 28, 1997, to determine the effect of the device according to the present invention on the quality of ordinary faucet water. More specifically, Table 1 shows the numerical values of nitric acid nitrogen, nitrous acid nitrogen, chlorine ion, organism (excess managanic acid potassium, consumption quality), general bacteria, and colon bacteria after the purification of the water using the device of the present invention. Accordingly, all levels of these contaminants were found to be suitable according to the water standards of Tokyo.

Next, in Table 2, listed are the physical characteristics of the purified water which were found to be within the acceptable levels according to the water standards of Tokyo. First, the PH level was found to be 7, which again, as shown in Table 2, is within the acceptable range of 5.8 to 8.6. In comparison, the PH level before the purification of the Tokyo water was 8.6. Second, although the water did not have any abnormal smell or taste before the purification of the water, there was no abnormal smell or taste to the purified water. Third, the color and turbidity of the purified water were found to be 1 degree and 0 degree, respectively, well within the water standards of Tokyo, as shown in Table 2. In constrast, the color and turbidity of the ordinary Tokyo water before purification were found to be 5 degrees and 2 degrees, respectively. Fourth and finally, the iron content of the purified water was found to be 0.05 mg/l, well below the Tokyo water standard of 0.3 mg/l. Before purification of the water, the iron content of the water was 0.3 mg/l.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims.

Further, it will be apparent to those of skill in the art that numerous changes may be made in such details without departing from the spirit and the principles of the invention.

What is claimed is:

1. An apparatus for a purification device which removes harmful substances from a contaminated object, wherein said apparatus comprises:

a first container;

a second container;

water;

charcoal;

an electric source;

wherein said second container is larger than said first container; wherein said charcoal is placed within said first container; wherein said first container, said contaminated object and said water are placed within said second container; and wherein said electric source generates an electric charge which is transmitted throughout said purification device.

2. An apparatus for a purification device which removes harmful substances from a contaminated object according to claim 1, wherein said first and second containers are conductive.

3. An apparatus for a purification device which removes harmful substances from a contaminated object according to claim 1, wherein said first container contains a plurality of holes.

4. An apparatus for a purification device which removes harmful substances from a contaminated object according to claim 1, wherein said second container is sealed with a cover.

5. An apparatus for a purification device which removes harmful substances from a contaminated object according to claim 1, wherein said second container is insulated from its supporting exterior surfaces.

6. An apparatus for a purification device which removes harmful substances from a contaminated object according to claim 1, wherein the voltage of said electric charge is 10,000 volts.

7. An apparatus for a purification device which removes harmful substances from a contaminated object according to claim 1, wherein said electric charge is applied for at least 1 hour.

8. An apparatus for a purification device which removes harmful substances from a contaminated object according to claim 1, wherein said electric charge is applied for at least 5 hours.

9. An apparatus for a purification device which removes harmful substances from a contaminated object according to claim 1, wherein said electric charge is applied for at least 10 hours.

10. An apparatus for a purification device which removes harmful substances from a contaminated object according to claim 1, wherein said second container comprises a spout for the removal of said water.

11. A method for the removal harmful substances from a contaminated object, wherein said method comprises:

placing charcoal inside a first container;

placing said first container inside a second container;

filling said second container with water;

immersing said contaminated object in said water; and transmitting an electric charge throughout said water;

wherein said electric charge is generated by an external electric source; wherein said electric charge flows throughout said water within said first and second containers; and wherein said electric charge, said charcoal and said water function together to purify said contaminated object.

12. A method for the removal harmful substances from a contaminated object according to claim 11, wherein said first and second containers are conductive.

13. A method for the removal harmful substances from a contaminated object according to claim 11, wherein said first container contains a plurality of holes.

14. A method for the removal harmful substances from a contaminated object according to claim 11, wherein said second container is sealed with a cover.

15. A method for the removal harmful substances from a contaminated object according to claim 11, wherein said second container is insulated from its supporting exterior surfaces.

16. A method for the removal harmful substances from a contaminated object according to claim 11, wherein said electric charge is 10,000 volts.

17. A method for the removal harmful substances from a contaminated object according to claim 11, wherein said electric charge is applied for at least 1 hour.

18. A method for the removal harmful substances from a contaminated object according to claim 11, wherein said electric charge is applied for at least 5 hours.

19. A method for the purification of a contaminated substance or material according to claim 11, wherein said electric charge is applied for at least 10 hours.

20. A method for the purification of a contaminated substance or material according to claim 11, wherein said second container comprises a spout for the removal of said water.

* * * * *